July 19, 1966 A. M. SCHAIBLE 3,261,436
REMOTE CONTROL LATCH MECHANISM FOR CLUTCH
Filed Feb. 8, 1965 2 Sheets-Sheet 1
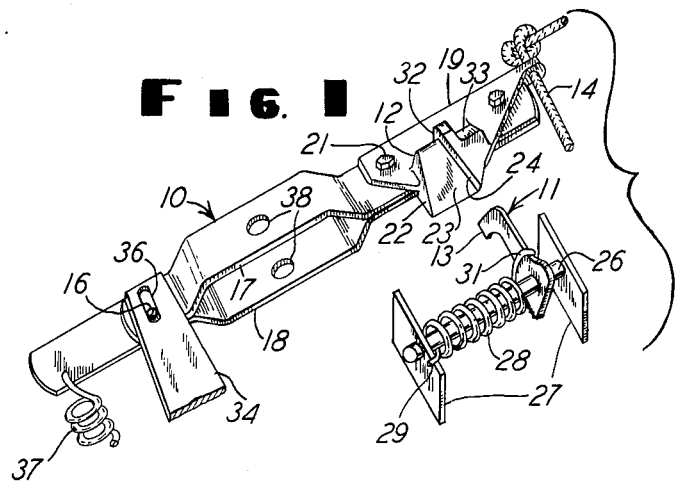
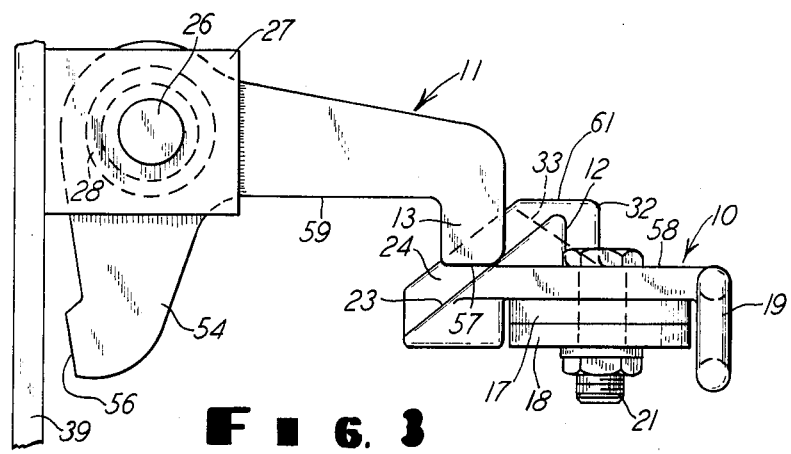
INVENTOR:
AARON M. SCHAIBLE
BY: Arthur J. Hansmann
ATTORNEY July 19, 1966    A. M. SCHAIBLE    3,261,436
REMOTE CONTROL LATCH MECHANISM FOR CLUTCH
Filed Feb. 8, 1965    2 Sheets-Sheet 2

INVENTOR:
AARON M. SCHAIBLE
BY
ATTORNEY

United States Patent Office 3,261,436
Patented July 19, 1966

3,261,436
REMOTE CONTROL LATCH MECHANISM
FOR CLUTCH
Aaron M. Schaible, Rockford, Ill., assignor to J. I. Case
Company, Racine, Wis., a corporation of Wisconsin
Filed Feb. 8, 1965, Ser. No. 431,051
7 Claims. (Cl. 192—22)

This invention relates to a latch-type of mechanism.

It is a general object of this invention to provide a latch-type of mechanism which can be latched and unlatched by remote control means but yet is reliable in its operation and sturdy in construction though no complicated and expensive parts are required.

Another object of this invention is to provide a latch-type of mechanism which can be both latched and unlatched by remote control means which is of a nature which applies a force in only one direction but which nevertheless accomplishes both the latching and unlatching of the mechanism. In this particular object, the remote control means may therefore be a flexible piece such as a rope or cable which can apply its force in only one direction but which is nevertheless satisfactory for actuation of the mechanism for both latching and unlatching functions.

Still another object of this invention is to provide a positive remote control to a device which requires engagement and disengagement, and to do so through a mechanism which secures the device in either the engaged or disengaged position as selected. In this particular instance, the device referred to may be one employing two parts of a drive, such as a clutch or a two-part jaw-type of drive, and the mechanism of this invention will effect the engagement and disengagement of the clutch or the like, and it will do so in a remote control manner.

Also, this particular invention has application in the art of agricultural implements and the like, and in fact it is useful in providing a remote control for clutching mechanisms interposed between the drive of a tractor and the driven parts of an implement such as the beater of a manure spreader. In this specific application, U.S. Patent No. 3,156,124 shows the employment of remote control means, including the rope extending to the tractor, which is utilized for engagement and disengagement between a drive shaft and a spreader beater. The present invention is also applicable in the same manner of controlling clutching means between a drive shaft and the spreader beater which is then driven off the drive shaft. This particular invention will therefore be described in relation to that particular art.

Other objects and advantages will become apparent upon reading the following description in light of the accompanying drawings, wherein:

FIG. 1 is a bottom perspective view of an embodiment of this invention with parts thereof spaced away from each other and with parts broken away, all for clarity of drawing.

FIG. 3 is an end elevational view of part of that shown in FIG. 2.

Figure 2:
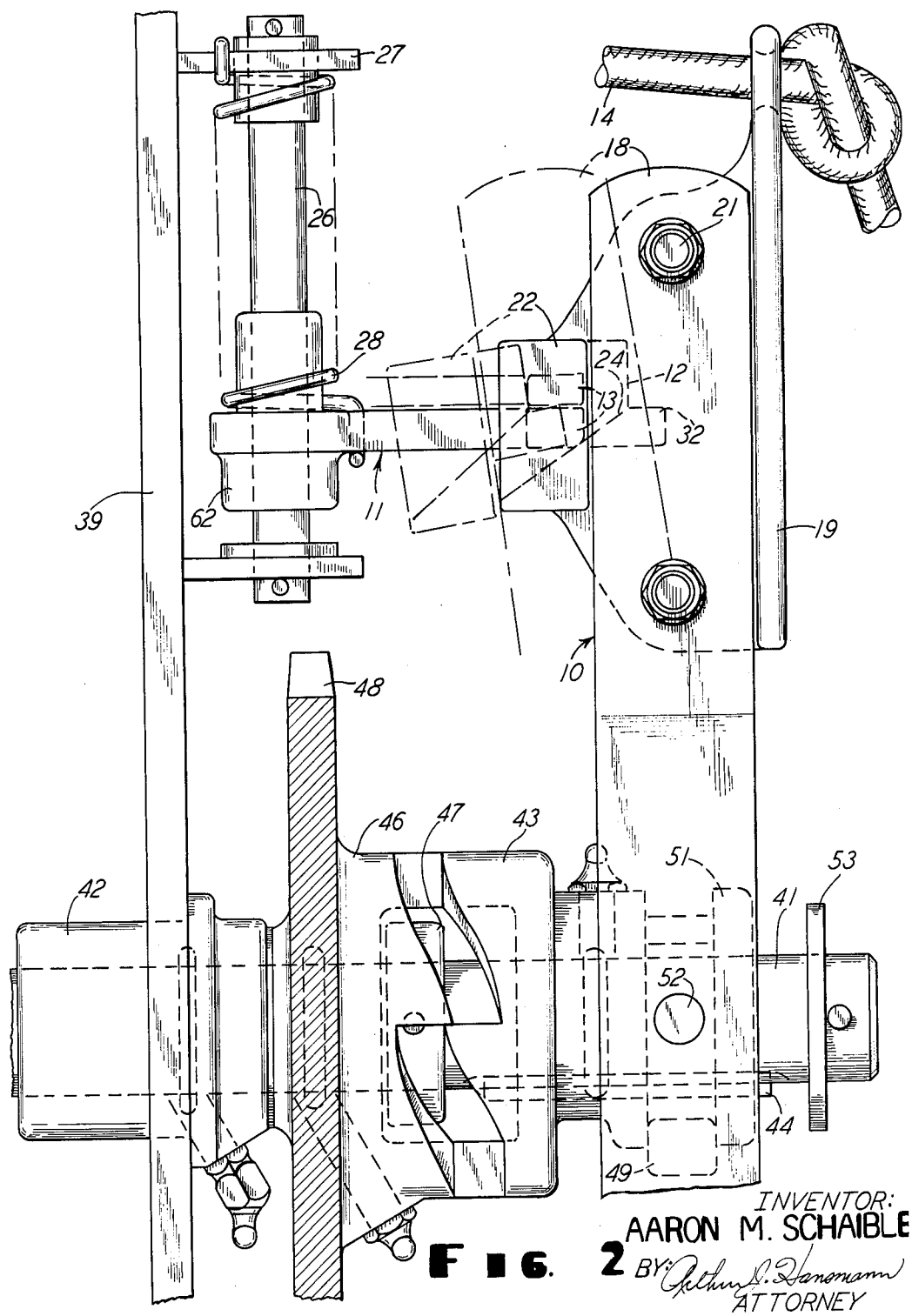
FIG. 2 is a top plan view of a slightly modified embodiment of a fragment of that shown in FIG. 1, and with parts thereof broken away and sectioned, and with parts thereof in moved positions as shown in dot-dash lines.

The latching mechanism of this invention is shown in FIG. 1 to consist generally of a pivotally mounted member generally designated 10, and a locking dog, generally designated 11. The member 10 has a shoulder 12 which engages the hooked end 13 of the dog 11 to latch or lock the two members 10 and 11 together for a purpose already mentioned and to be more fully described hereinafter. However, at this time, it will be mentioned that the dog 11 is locked with the shoulder 12, and is also unlocked therefrom, both the locking and unlocking being accomplished by means of the rope 14 which of course can apply a force only in one direction and is therefore a remote control member particularly convenient for actuation of this mechanism as the unshown end of the rope 14 could extend to a tractor or the like for control by the operator from the seat of the tractor (unshown). Of course the rope 14 is attached to the member 10 to transfer the tension force along the rope 14 and to the member 10 for pivoting the latter about a pin 16 which extends through the member 10 and serves for mounting the member 10 on the implement or other suitable object. The member 10 is thus shown to be comprised of a piece 17 and a piece 18, and the pin 16 extends through the pieces 17 and 18. Also, a piece 19 is secured to the ends of the pieces 17 and 18 by means of the bolts, such as the bolt 21.

The piece 19 carries the shoulder 12, and it also carries a ramp 22 having an inclined surface 23. Also, a shoulder or second ramp 24 is disposed on the piece 19 adjacent the surface 23, and the two surfaces 23 and 24 extend to the shoulder 12. It will also be noticed that the shoulder or surface 24 is angled, rather than tangential, with respect to the arc of movement of the member 10, and the shoulder 24 will actually engage the hooked end 13 of the dog 11 to laterally displace the dog 11 as the latter slides up the ramp 23 and along the shoulder 24 until the hooked end 13 locks with the shoulder 12 as the dog 11 extends over the shoulder 12.

Thus the members 10 and 11 are mounted adjacent each other so that upon pulling on the rope 14 the member 10 will pivot about its pin 16 and cause the ramp 23 to slide under the dog 11. The dog 11 is thus rotated on its mounting shaft 26 which is shown secured in side plates 27 which are stationarily mounted on the implement or the like. Also, the dog 11 is laterally displaced to the left as viewed in FIG. 1, as the dog 11 engages the shoulder 24 and the latter is slid along the far side of the dog 11 in the pivotal movement of the member 10. Therefore, the dog 11 is both rotated and laterally displaced, and both of these movements are directed counter to the force exerted by the combined compression and torsion spring 28 which is piloted on the shaft 16 with one end 29 anchored on the plate 27, and the other end 31 anchored on the dog 11. This spring 28 therefore normally rotates the dog 11 so that the hooked end 13 moves downwardly, and it also urges the dog 11 to the right as viewed in FIG. 1. Thus, the spring 28 is cocked when the member 10 is pivoted against the dog 11.

The foregoing generally describes the invention and its function in latching or locking the parts 10 and 11 together. Finally, it should be understood that further pulling on the rope 14 will cause the member 10 to pivot still further, beyond a point where the shoulder 12 is locked with the hooked end 13 of the dog 11. Such further pulling will permit the dog hooked end 13 to be free of both the shoulder 12 and a shoulder 32 which extends beyond the shoulder 12 and is disposed laterally of the dog 11 when the parts are latched together as described. When the member 10 is thus further pivoted to have the dog hooked end 13 free of the shoulder 32, then the spring 28 will return the dog 11 to its original position, namely, to the right as viewed in FIG. 1 and thus beyond the shoulder 32. The parts 10 and 11 are therefore unlatched and free to pivot relatively away from each other as the part 10 pivots upwardly in FIG. 1 and away from the dog 11. The part 10 therefore pivots so that the portion designated 33 slides under the dog hooked end 13 in this unlatching process.

FIG. 1 further shows a support member 34 retains the pin 16 in a slot 36 in the member 34. Also, a tension spring 37 is attached to the member 10 on the side of the pivot pin 36 opposite from the latching shoulder 12, and the spring 37 thus normally yieldingly urges the shoulder 12 away from the dog 11. This is therefore the means by which the two parts are unlocked after the rope has been pulled to an extent necessary to have the shoulder 32 clear the dog hooked end 13, and then release of the rope tension will permit the spring 37 to pivot the member 10 away from the dog 11 as described. Of course the spring 37 is fragmentarily shown, and the end thereof opposite the member 10 would be stationarily mounted on a part of the implement in any convenient and well-known manner.

FIG. 1 also shows openings 38 in pieces 17 and 18, and these openings 38 are available for mounting a mechanism, such as a clutch of the jaw-type shown in FIG. 2 described later. It is of course the engagement and disengagement of the clutch which is the purpose of the latching mechanism in the environment shown. Further, it will be understood that when the clutch is in the engaged position, the dog 11 is locked with the shoulder 12 and it is still desired that additional pivoting of the member 10 be accomplished in order to unlock the parts. Therefore, the slot 36 is effective in permitting the member 10 to actually pivot about the axis of the opening 38 for the unlatching function.

FIGS. 2 and 3 thus show a slight modification of the mechanism, and the locking dog 11 and the member 10 are shown to be what might be termed intermediate in their relative positions between being fully unlatched and latched. That is, FIG. 3 for instance more clearly shows that the member 10 is in contact with the locking dog 11, and the latter is approximately half-way up on the ramp 23. FIG. 2 shows the angled ramp or surface 24 which displaces the locking dog 11 upwardly in FIG. 2 as described in connection with FIG. 1. Thus, it will be understood, that the member 10 will be rotated by the pull on the rope 14 until it reaches the dot-dash position shown in FIG. 2. In this position, the dog hooked end 13 is engaged with the shoulder 12, and the parts are therefore locked together as indicated in dot-dash lines in FIG. 2. Further rope pull will cause the shoulder 32 to move beyond the dog hooked end 13 so that the entire dog 11 can move downwardly, as viewed in FIG. 2, and it will do so under the influence of the spring 28 which has been cocked, and this will of course unlatch the parts 10 and 11.

FIG. 2 also shows that the plates 27 are mounted on a piece 39 which may be a part of the implement such as the manure spreader. Also, the piece 39 rotatably supports a shaft 41 through a bushing 42 which is affixed to the piece 39. The shaft 41 has one-half 43 of a jaw clutch keyed thereto by means of a key 44. Thus the half 43 is of course slidable along the shaft 41. The other jaw clutch half 46, is free to rotate on the shaft 41, and is axially secured thereon by means of the bushing 42 on one side and a washer or the like 47 on the other side of the jaw 46. It will also be noted that the jaw 46 carries a sprocket 48 which of course rotates with the rotation of the jaw 46 and would be utilized for driving a chain (not shown) trained on the sprocket 48. Thus the shaft 41 would be rotated by a means not shown, and the purpose of the mechanism described herein is to engage the jaw halves 43 and 46 for transmitting rotation therebetween as desired.

A yoke 49 is shown engaged with a slotted end 51 of the jaw half 43 such that the latter may rotate of course with respect to the yoke 49, but the yoke 49 axially positions the jaw 43. A pin 52 extends through the openings 38 in the pieces 17 and 18, and the pin 52 engages the yoke or member 49 for transmitting the pivotal motion of the members 17 and 18 to the jaw clutch 43 in any convenient manner such that described and indicated. A stop washer 53 is mounted on the shaft 41 to prevent the shaft and the clutch mechanism described from being separated but yet permitting the sliding motion of the jaw half 43 as described.

FIG. 3 also shows the locking dog 11 has a stop 54 which prevents the dog 11 from rotating clock-wise, as viewed in FIG. 3, beyond a point where the stopping surface 56 abuts the fixed member 39. This therefore assures that the dog end 13 will always engage the ramp 23 after the parts 10 and 11 have been separated and are again ready to be pivoted together. Also, it permits for possible initial loading of the spring 28 so that the dog 11 is yieldingly urged clock-wise, as viewed in FIG. 3, as soon as it is in a position where the stop surface 56 is off the piece 39. It will be noted that the hooked end 13 of the dog 11 is of a length which permits the lower edge 57 to rest on the top surface 58 of the member 19 and yet have the dog surface 59 clear the top surface 61 of the shoulder 32 for the unlatching function. Also, it is of course preferred that the dog 11 have a bushing 62 mounted on the shaft 26 so that the dog 11 is fully guided and piloted on the shaft 26 for the lateral displacement of the dog 11 without cocking and binding with respect to the shaft 26, and thus the bushing 62 is long as shown in FIG. 2.

It will of course be understood that between the arrangements shown in FIG. 1 and FIGS. 2, 3, the angularity of the ramps described is reversed with respect to the spring retaining the dog 11. Of course in both instances the dog is laterally displaced so that the spring is compressed as the dog is actuated by the ramps.

The two pivot points defined by pin 16 and holes 18 in FIG. 1 are alternately useful in the latching and unlatching, respectively, as mentioned. In the process of engaging the clutch, the arms 17 and 18 pivot about pin 16, creating a long lever arm from pin 16 to rope 14 and a short lever arm between pin 16 and spring 37. This allows the main member 18 to be rotated about pin 16 without much force applied to rope 14. In the process of disengaging the clutch, the main members 17 and 18 pivot about holes 38. This creates a shorter lever arm to rope 14 and a longer lever arm to the spring 37, which in turn increases the force required to rotate the main members. This change in force is what signals the operator of the mechanism when the drive is engaged.

While two variations of an embodiment of the invention have been shown and described, it should be obvious that certain changes could be made in the embodiment, and the invention should therefore be determined by the scope of the appended claims.

What is claimed is:

1. A lockable and unlockable mechanism actuated by an actuating force applied in only one direction for both locking and unlocking, comprising a locking dog rotatably and laterally movably mounted, a member relatively movably mounted with respect to said locking dog and having a shoulder lockable with said locking dog and including two ramps adjacent said shoulder and engageable with said locking dog and respectively angled for respectively rotating and laterally moving said locking dog upon relative movement in one direction between said member and said locking dog, said member having surfaces for retaining said locking dog in both the rotated and laterally moved positions while said locking dog is locked on said shoulder, actuating means connected to one of said locking dog and said member for inducing the relative movement in said one direction until said mechanism is locked and for inducing additional relative movement in said one direction, and means operatively associated with said locking dog for returning the latter to its lateral position and free of said shoulder upon said additional relative movement.

2. A lockable and unlockable mechanism actuated by an actuating force applied in only one direction for both locking and unlocking, comprising a locking dog rotatably and laterally movably mounted, a member relatively movably mounted with respect to said locking dog and having a shoulder lockable with said locking dog and including a ramp adjacent said shoulder and engageable with said locking dog and angled for moving said locking dog laterally to one side from an initial position upon relative movement in one direction between said member and said locking dog, said member having a surface for retaining said locking dog in the laterally moved position to maintain said locking dog locked on said shoulder, actuating means connected to one of said locking dog and said member for inducing the relative movement in said one direction until said mechanism is locked and for inducing additional relative movement in said one direction, and means operatively associated with said locking dog for laterally urging the latter to the side opposite said one side for returning said locking dog to said initial lateral position and free of both said shoulder and said ramp upon said additional relative movement.

3. A lockable and unlockable mechanism actuated by an actuating force applied in only one direction for both locking and unlocking, comprising a locking dog rotatably and laterally movably mounted, a member relatively movably mounted with respect to said locking dog and having a shoulder lockable with said locking dog and including two ramps adjacent said shoulder and engageable with said locking dog and respectively angled for respectively rotating and laterally moving said locking dog upon relative movement in one direction between said member and said locking dog, said locking dog being retained in both the rotated and laterally moved positions while said locking dog is locked on said shoulder, a rope connected to one of said locking dog and said member for inducing the relative movement in said one direction until said mechanism is locked and for inducing additional relative movement in said one direction, and a combined torsion and compression spring connected to said locking dog for returning the latter to its lateral position and free of said shoulder upon said additional relative movement.

4. A lockable and unlockable mechanism actuated by an actuating force applied in only one direction for both locking and unlocking, comprising a locking dog rotatably and laterally movably mounted, a member relatively movably mounted with respect to said locking dog and having a first shoulder lockable with said locking dog and having a second shoulder adjacent said first shoulder and with said second shoulder being engageable with said locking dog and oblique with respect to said first shoulder for laterally moving said locking dog upon relative movement in one direction between said member and said locking dog, said member having means for retaining said locking dog in both the rotated and laterally moved positions while said locking dog is locked on said first shoulder, actuating means connected to one of said locking dog and said member for inducing the relative movement in said one direction until said mechanism is locked and for inducing additional relative movement in said one direction, and spring means operatively associated with said locking dog adapted to be cocked when said locking dog is laterally moved by said second shoulder and with said spring being arranged for returning said locking dog to its lateral position and free of both said shoulders upon said additional relative movement.

5. A shiftable mechanism positionable in a locked position and an unlocked position, comprising a locking dog, a member movably mounted for movement toward and away from said locking dog for locking and unlocking with the latter, a spring engaged with said locking dog to have the latter rotatably and laterally movably mounted and spring loaded, said member having a locking shoulder for locking engagement with said locking dog and being arranged with means for laterally moving said locking dog against its spring upon movement of said member toward said locking dog, said locking shoulder and said locking dog being arranged for unlocking under the influence of said spring and in response to further movement of said member, a clutch operatively associated with said member for engagement and disengagement respectively corresponding to said locking and unlocking, and a spring connected to said member for urging the latter away from said locking dog.

6. A shiftable mechanism positionable in a locked position and an unlocked position and operatively associated with a clutch for engaging and disengaging said clutch, comprising a locking dog, an elongated member pivotally mounted to have one end movable toward and away from said locking dog for locking and unlocking with the latter, a spring engaged with said locking dog to have the latter spring-loaded and being rotatably and laterally movably mounted, said member having a locking shoulder on said end for locking engagement with said locking dog and being arranged with means for laterally moving said locking dog against its spring upon movement of said member toward said locking dog, said locking shoulder and said locking dog being arranged for unlocking under the influence of said spring and in response to further movement of said member, a clutch operatively associated with said member at a location on the lattter to the end thereof on the same side of the pivot as the location of said locking shoulder and with said clutch being engageable and disengageable respectively corresponding to said locking and unlocking, and providing a fulcrum for said member in the engaged position, a spring connected to said member to the end thereof on the opposite side of the pivot from the locking shoulder for urging the latter away from said locking dog, the pivot of said member being a lost motion type allowing for pivot of said member about said clutch when the latter is engaged and said member is pivoted for unlocking.

7. A shiftable mechanism positionable in a locked position and an unlocked position for controlling a clutch, comprising a locking dog, a member pivotally mounted for movement toward and away from said locking dog for locking and unlocking with the latter at one side from the pivot of said member, a rope connected to said member for pulling on the latter in one direction only for pivoting same, a clutch operatively associated with said member at a location on the latter to said one side of the pivot of said member for engagement and disengagement respectively corresponding to said locking and unlocking, and a spring connected to said member at a location on the latter to the other side from the pivot of said member for urging the latter away from said locking dog, said member being pivotally mounted through a slotted connection to present a movable pivot for pivotal movement of said member when said clutch is engaged and said rope is pulled.

No references cited.

DAVID J. WILLIAMOWSKY, *Primary Examiner.*

A. T. McKEON, *Assistant Examiner.*